United States Patent
Gravesen et al.

(10) Patent No.: US 10,857,678 B2
(45) Date of Patent: Dec. 8, 2020

(54) ROBOTIC SYSTEM AND METHOD FOR MANUFACTURING OF OBJECTS

(71) Applicant: Danmarks Tekniske Universitet, Kgs. Lyngby (DK)

(72) Inventors: Jens Gravesen, Virum (DK); David Brander, Kgs. Lyngby (DK); Jakob Andreas Bærentzen, Copenhagen V (DK); Steen Markvorsen, Brønshøj (DK); Toke Bjerge Nørbjerg, Copenhagen Ø (DK); Kasper Hornbak Steenstrup, Kgs. Lyngby (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 0 days.

(21) Appl. No.: 16/084,428

(22) PCT Filed: Mar. 14, 2017

(86) PCT No.: PCT/EP2017/055958
§ 371 (c)(1),
(2) Date: Sep. 12, 2018

(87) PCT Pub. No.: WO2017/157917
PCT Pub. Date: Sep. 21, 2017

(65) Prior Publication Data
US 2019/0039248 A1   Feb. 7, 2019

(30) Foreign Application Priority Data

Mar. 14, 2016   (EP) .................................... 16160088

(51) Int. Cl.
*B25J 11/00* (2006.01)
*B26D 1/547* (2006.01)
(Continued)

(52) U.S. Cl.
CPC ........... *B25J 11/0055* (2013.01); *B25J 9/009* (2013.01); *B25J 9/1682* (2013.01); *B26D 1/547* (2013.01);
(Continued)

(58) Field of Classification Search
CPC ......... B25J 11/0055; B25J 9/009; B26D 7/01; B26D 3/006; B26D 5/086; B26D 5/06
See application file for complete search history.

(56) References Cited

U.S. PATENT DOCUMENTS

| | | | |
|---|---|---|---|
| 4,068,548 A | 1/1978 | Ross | |
| 4,077,301 A | 3/1978 | Brahm | |

(Continued)

FOREIGN PATENT DOCUMENTS

| | | |
|---|---|---|
| DE | 1 807 804 A1 | 6/1970 |
| DE | 2 632 940 A1 | 3/1978 |

(Continued)

OTHER PUBLICATIONS

Machine Translation for WO 98/14311, obtained Jan. 2020 (Year: 1998).*

(Continued)

*Primary Examiner* — Rocio Del Mar Perez-Velez
*Assistant Examiner* — Vi N Tran
(74) *Attorney, Agent, or Firm* — Ice Miller LLP

(57) ABSTRACT

A method and a system for manufacturing a mold for creation of complex objects by controlling and moving two end effectors of a robotic system is provided. The two end effectors have a flexible cutting element attached to, and extending between, the two end effectors. The method includes the steps of: defining at least one surface representing the inner surface of the mold; dividing the surface into a number of segments represented by planar curves on the surface; for each planar curve, calculating at least one (Continued)

elastic curve representing the planar curve; for each calculated elastic curve, calculating a set of data corresponding to placement and direction of the two end effectors for configuring the flexible cutting element to a shape corresponding to the calculated elastic curve; and sequentially positioning the end effectors according to each set of data. The flexible cutting element thereby cuts the mold from a block.

16 Claims, 5 Drawing Sheets

(51) Int. Cl.
| | |
|---|---|
| G05B 19/4099 | (2006.01) |
| B26D 7/01 | (2006.01) |
| B26D 3/00 | (2006.01) |
| G06T 17/30 | (2006.01) |
| B26D 1/00 | (2006.01) |
| B25J 9/00 | (2006.01) |
| B25J 9/16 | (2006.01) |
| B26D 5/00 | (2006.01) |
| B26F 3/08 | (2006.01) |
| B26D 5/06 | (2006.01) |
| B26D 5/08 | (2006.01) |

(52) U.S. Cl.
CPC ............ *B26D 3/006* (2013.01); *B26D 5/005* (2013.01); *B26D 5/06* (2013.01); *B26D 5/086* (2013.01); *B26D 7/01* (2013.01); *B26F 3/08* (2013.01); *G05B 19/4099* (2013.01); *G06T 17/30* (2013.01); *B26D 2001/006* (2013.01); *G05B 2219/39109* (2013.01); *G05B 2219/40205* (2013.01)

(56) References Cited

U.S. PATENT DOCUMENTS

| | | | | |
|---|---|---|---|---|
| 4,683,791 A | | 8/1987 | Demont | |
| 5,266,021 A | * | 11/1993 | Jacobson | B29C 55/00 425/334 |
| 5,950,512 A | | 9/1999 | Fields | |
| 2015/0277436 A1 | * | 10/2015 | Kalmar-Nagy | G05B 19/40937 700/187 |
| 2016/0024780 A1 | * | 1/2016 | Sevtsuk | E04B 1/32 52/474 |
| 2018/0050460 A1 | * | 2/2018 | Gonzalez Bohme | B26D 1/0006 |

FOREIGN PATENT DOCUMENTS

| | | | |
|---|---|---|---|
| DE | 102 01 614 A1 | 7/2003 | |
| DE | 10 2004 050 867 A1 | 5/2006 | |
| DE | 10 2007 017 471 A1 | 10/2008 | |
| DE | 20 2008 002 669 U1 | 7/2009 | |
| DE | 10 2008 051864 A1 | 4/2010 | |
| EP | 0 050 689 A2 | 5/1982 | |
| EP | 1 579 965 A1 | 9/2005 | |
| EP | 2 402 125 A1 | 1/2012 | |
| EP | 2 532 808 A1 | 12/2012 | |
| FR | 2 321 384 A1 | 3/1977 | |
| GB | 2 248 571 A | 4/1992 | |
| JP | 2012-192464 A | 10/2012 | |
| KR | 2011-0085047 A | 7/2011 | |
| WO | 88/00367 A1 | 1/1988 | |
| WO | 98/14311 A1 | 4/1998 | |
| WO | WO-9814311 A1 * | 4/1998 | ............ B26D 3/006 |
| WO | 2009106303 A1 | 9/2009 | |
| WO | 2014/121917 A1 | 8/2014 | |
| WO | 2015/034438 A1 | 3/2015 | |

OTHER PUBLICATIONS

Singer D., Lectures on Elastic Curves and Rods, Case Western Reserve Univ, Cleveland, 2007 (Year: 2007).*
Int'l Search Report dated May 17, 2017 in Int'l Application No. PCT/EP2017/055958.
Berger, "Prototypen-fertigung mit Industrie-robotern," ZWF Zeitschrift fur Wirtschaftliche Fertigung and Automatisierung, vol. 99, No. 11, pp. 539-541 (Nov. 1993).
Steenstrup et al., "Bladerunner: Surface rationalisation for HotWire and HotBlade Technology", Poster 2013.
Steenstrup et al., "Surface rationalisation for HotWire and HotBlade technology", Poster 2014.
Brander et al., "Approximation by Planar Elastic Curves", arXiv. org, 16 pages, Sep. 2015.
International Preliminary Report on Patentability dated Sep. 27, 2018 in International Application No. PCT/EP2017/055958.

* cited by examiner

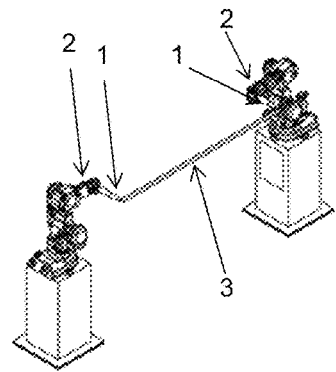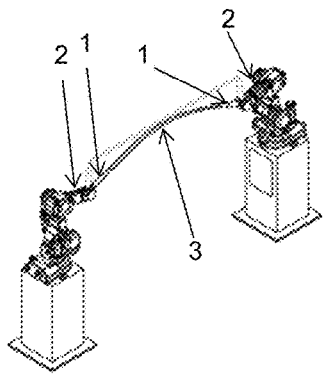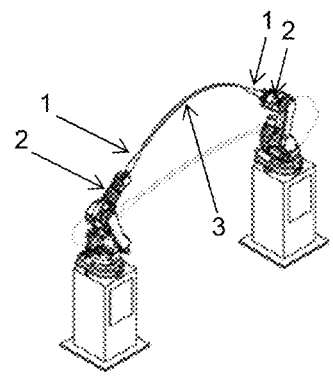
FIG. 1a  FIG. 1b  FIG. 1c
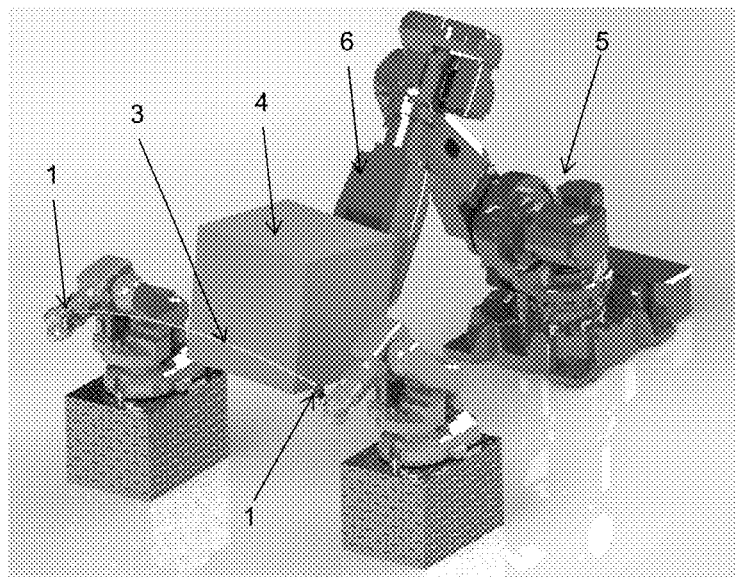
FIG. 2

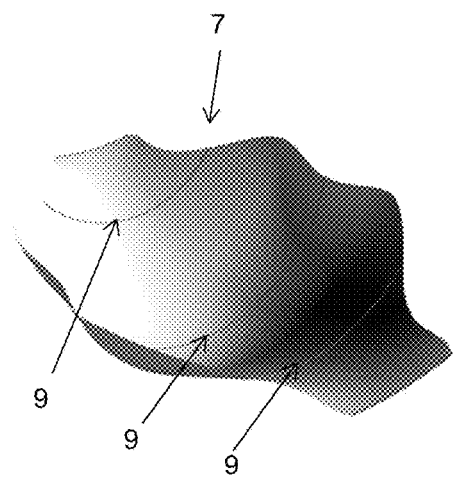
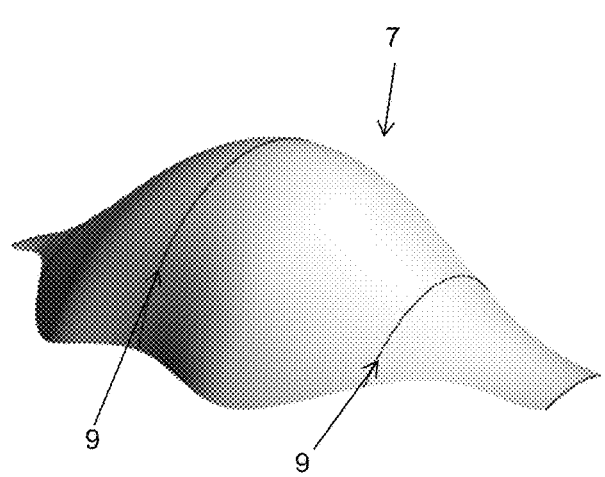
FIG. 3a  FIG. 3b
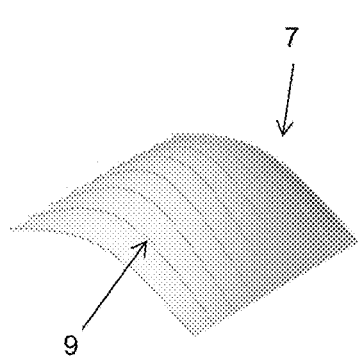
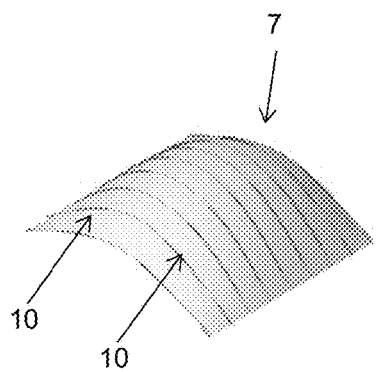
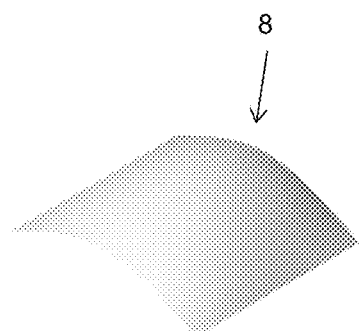
FIG. 4a  FIG. 4b  FIG. 4c

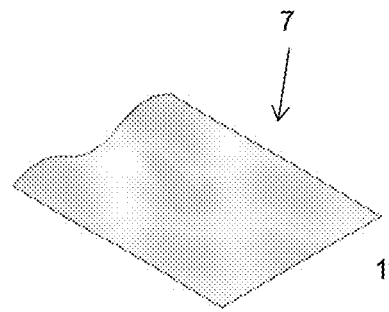
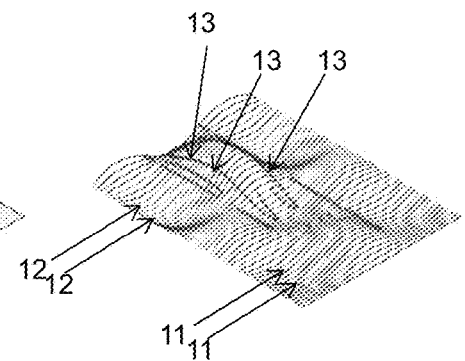
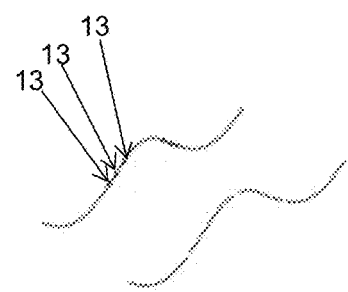
FIG. 5a　　　　FIG. 5b　　　　FIG. 5c
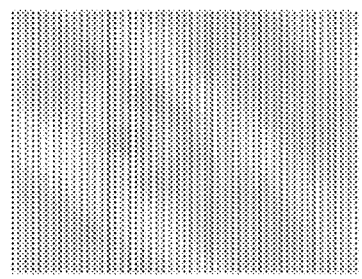
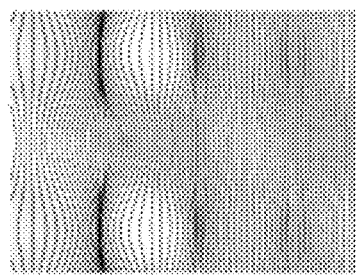
FIG. 6a　　　　　　FIG. 6b
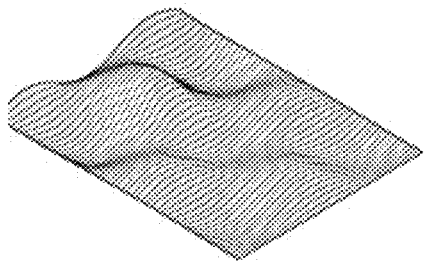
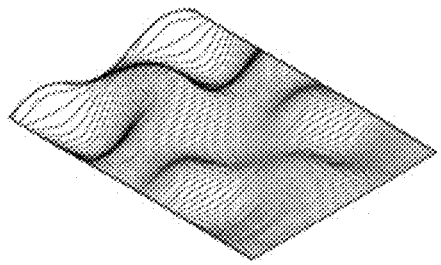
FIG. 6c　　　　　　FIG. 6d

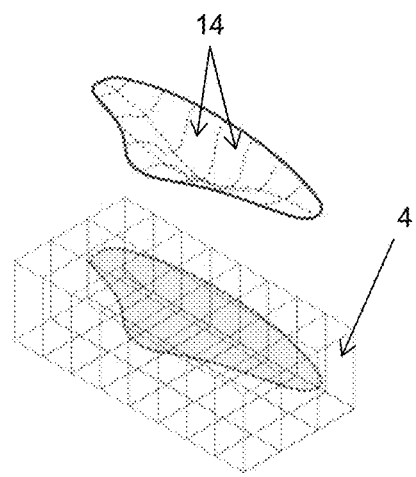 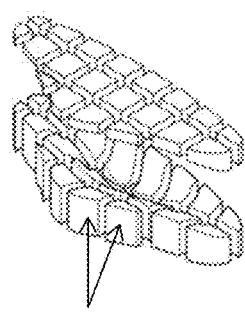 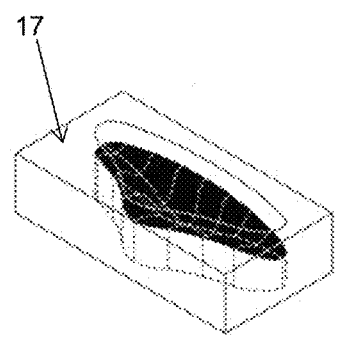
FIG. 9a    FIG. 9b    FIG. 9c
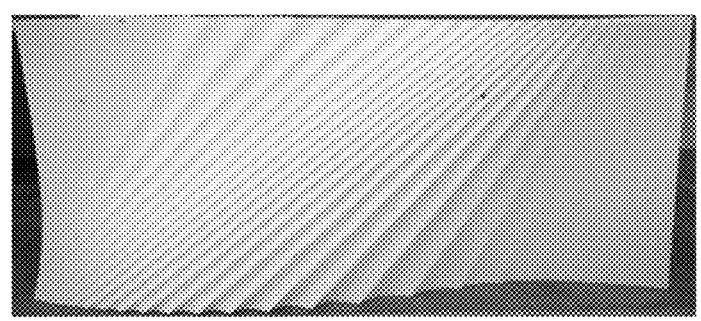
FIG. 10

ROBOTIC SYSTEM AND METHOD FOR MANUFACTURING OF OBJECTS

CROSS-REFERENCE TO RELATED APPLICATIONS

This application is a Section 371 of International Application No. PCT/EP2017/055958, filed Mar. 14, 2017, which was published in the English language on Sep. 21, 2017, under International Publication No. WO 2017/157917 A1, which claims priority under 35 U.S.C. § 119(b) to European Application No. 16160088.7, filed Mar. 14, 2016, and the disclosures of which are incorporated herein by reference.

BACKGROUND OF THE INVENTION

The present disclosure relates to a robotic system and method for manufacturing of objects, in particular objects having complex shapes, by controlling a robot having two end effectors and a cutting element attached to and extending between the two end effectors.

The vast majority of contemporary building designs are restrained to a formal language of planar surfaces and derivative geometric constructs; a constraint that stems from the practicalities of construction, which favors the use of mass-produced semi-manufactures and—for concrete in particular—modular, reusable formwork systems. An increasing number of high-profile project designs challenge the dominant paradigm. The challenge is posed by advanced building design projects, which utilize manual production of formwork to achieve complex curvatures; and building projects which employ large scale computer numerical control (CNC) milling to realize advanced structures. However, neither manual formwork production, nor large scale CNC milling provides a cost-effective option for general construction, and projects of this type therefore require extraordinary budget frameworks for realization. Contemporary construction currently employs either manually produced formwork or automated CNC milling of foam molds for the realization of complex concrete structures.

DE 10 2008 051861 A1 discloses a device for cutting of plastic foams. The device has a conveyor belt for feeding plastic foam. Two holders are arranged stationary, one on each side, to the conveyor belt, and hold a cutting means between the holders and over the conveyor such that the plastic foam is continuously cut when the conveyor moves in relation to the two holders. The holders and conveyor belt are configurable in two cutting dimension such that a cutting angle along the feed direction of the conveyor belt and an angle perpendicular to the feed direction of the conveyor belt can be controlled. One drawback of such a device is that it is only capable of cutting relatively simple shapes limited by the tensioned cutting wire.

BRIEF SUMMARY OF THE INVENTION

The present disclosure relates to a method for manufacturing a mold for creation of complex objects, such as concrete objects, by controlling and moving two end effectors of a robotic system, the two end effectors having a flexible cutting element attached to and extending between the two end effectors. In a first embodiment the method comprises the steps of:
  defining at least one surface representing the inner surface of the mold;
  dividing the surface into a number of segments represented by planar curves on the surface;
  for each planar curve, calculating at least one elastic curve representing the planar curve;
  for each calculated elastic curve, calculating a set of data corresponding to placement and direction of the two end effectors for configuring the flexible cutting element to a shape corresponding to the calculated elastic curve;
  sequentially positioning the end effectors according to each set of data, the flexible cutting element thereby cutting the mold from a block.

The method allows for more efficient manufacturing of molds having complex shapes, and thereby also more efficient manufacturing of objects having complex shapes. The disclosed technique for controlling two end effectors and a flexible cutting element is significantly faster and more efficient than manual formwork production and automated CNC milling.

A conventional hotwire foam cutter is a tool used to cut foam materials, typically polystyrene and similar materials. The device consists of a metal wire, often made of stainless steel, which is heated. As the wire is passed through the material to be cut, the heat from the wire vaporises the material just in advance of contact. In the previously known devices, the hotwire extends between two arms of a rigid frame and corresponds to a substantially straight line. A robot could be programmed to move the frame to cut shapes in the foam. However, the frame with hotwire could only cut straight lines, or simple single-ruled surfaces if the frame with hotwire would be moved in a ruled movement.

In the presently disclosed method and system, the inventors have realized that by using a flexible cutting element, more complex surfaces can be cut by means of a robotic system. The two end effectors of the robotic system can be positioned by controlling the distance between the end effectors and the direction of the end effectors (corresponding to the orientation of the sections of the cutting element next to the attachment points) such that the flexible cutting element is shaped of a known curve.

Surfaces that bend in two directions at the same time and cannot be made out of a flat material are called 'double curved'. In the presently disclosed method, in order to cut an entire complex surface, such as a double curved surface, the surface may be divided into a number of segments that are represented by planar curves. A collection of planar curve may hence represent the entire surface to cut. The planar curve may be cross-sections of the contour of the mold to cut. The surface may be provided to the method and system by means of e.g. three-dimensional drawing software using any kind of numerical representation.

For each planar curve, at least one elastic curve that represents the planar curve is calculated. An Euler elastica or elastic curve is the solution to the variational problem of minimizing the bending energy among curves of a given length with fixed endpoints and with the tangents prescribed at the endpoints. For the presently disclosed method, this means that the flexible cutting element is fixed between the two end effectors. The shape of the cutting element is the curve that, subject to the endpoint constraints, minimizes the elastic energy. Preferably, the calculated elastic curve should represent a shape as close as possible to the corresponding planar curve of the surface segment. Different approaches may be used to minimize the difference or distance between the elastic curve and the planar curve.

For each elastic curve, a set of data corresponding to placement and direction of the two end effectors for configuring the flexible cutting element to a shape corresponding to the calculated elastic curve may then be calculated.

Preferably, the sets of data also take into account the placement of the planar curves in relation to each other. The sets of data may take into account the placement of the planar curves in relation to each other such that the speed of different parts of the cutting element only vary within some given limits. One reason for controlling the placement of the planar curves in relation to each other in this way is to ensure that the cutting is substantially uniform over the whole cutting element. If e.g. a foam block is cut by means of a hotwire, the cutting process is performed by melting the material of the block. The slower the cutting element moves, the more the block around it melts. Preferably, the different parts of the cutting element move in approximately the same speed.

By calculating the distance between the end effectors and orientation of the end effecters, which create a specific elastic curve of the cutting element, more complex shapes can be cut than a fixed frame with a straight cutting element.

As stated, a collection of planar curve may represent the entire surface to cut. With a set of data corresponding to placement and direction of the two end effectors for each planar curve, the collection of data sets may be used to sequentially position the end effectors according to each subsequent set of data. The cutting element thereby cuts the surface defining the inner surface of the mold from a block.

The present disclosure further relates to a robotic system for manufacturing a mold for creation of complex objects, or more generally, for creation of complex surfaces from a block, the system comprising:
- at least two robotic arms, each robotic arm having an end effector;
- a flexible cutting element attached to and extending between the two end effectors; and
- computing means configured to control the end effectors and execute the calculations according to the presently disclosed method.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 1a-c shows an embodiment of the system having two robots with end effectors holding a cutting wire in different positions;

FIG. 2 shows a further embodiment of the presently disclosed system for manufacturing a mold for creation of complex objects, wherein the block from which the mold is cut is held by a third robot;

FIGS. 3a-b show examples of elastic-swept surfaces comprising planar curves;

FIG. 4a shows an original surface of an object;

FIG. 4b shows an original surface of an object with elastic curves representing segments of the surface;

FIG. 4c shows a rationalized surface recreated by sweeping of elastic curves;

FIG. 5a shows an original input surface;

FIG. 5b shows a representation of planar curves with different number of inflection points;

FIG. 5c shows one planar curve being divided into sub-sections to reduce the number of inflection points for a sub-section;

FIGS. 6a-d show how the surface may change when the surface is optimized with regard to inflection points;

FIG. 9a shows a representation of a surface in a block, the surface divided into sub-surfaces;

FIG. 9b shows the sub-surfaces cut into sub-blocks of a mold;

FIG. 9c shows the sub-blocks put together to form a complete mold; and

FIG. 10 shows an example of an object created by the presently disclosed method and system.

DETAILED DESCRIPTION OF THE INVENTION

The present disclosure relates to a method for representing a surface by dividing it into segmented curves of the surface, express the curves in terms of elastic-swept surfaces, applying an approximation algorithm by extracting a number of parameters and optimizing the parameters to get a close fit to the original curves. By interpolating the control parameters a rationalized design is obtained—a new surface, which is swept out by elastic curves moving through space.

In a first embodiment, a method for manufacturing a mold for creation of complex objects, such as concrete objects, by controlling and moving two end effectors of a robotic system, the two end effectors having a flexible cutting element attached to and extending between the two end effectors, comprises the steps of:
- defining at least one surface representing the inner surface of the mold;
- dividing the surface into a number of segments represented by planar curves on the surface;
- for each planar curve, calculating at least one elastic curve representing the planar curve;
- for each calculated elastic curve, calculating a set of data corresponding to placement and direction of the two end effectors for configuring the flexible cutting element to a shape corresponding to the calculated elastic curve;
- sequentially positioning the end effectors according to each set of data, the flexible cutting element thereby cutting the mold from a block.

One advantage of this method is that it is an efficient and fast way of creating complex surfaces. The method may be used for example for robotic formwork of parts of large buildings or other building projects such as bridges having complex shapes. The presently disclosed method may be used for industrial production on an architectural scale.

Surfaces that bend in two directions at the same time and cannot be made out of a flat material are called 'double curved'. The presently disclosed method is capable of realization of general double curved structures, whereas a conventional hotwire foam cutter is only capable of cutting straight lines, or simple single-ruled surfaces if the frame with hotwire would be moved in a ruled movement. A conventional hotwire cutter cannot cut negatively-curved surfaces. In the presently disclosed method, the surface representing the inner surface of the mold may be a positively-curved surface, a negatively-curved surface or a double-curved surface.

Figure 8:
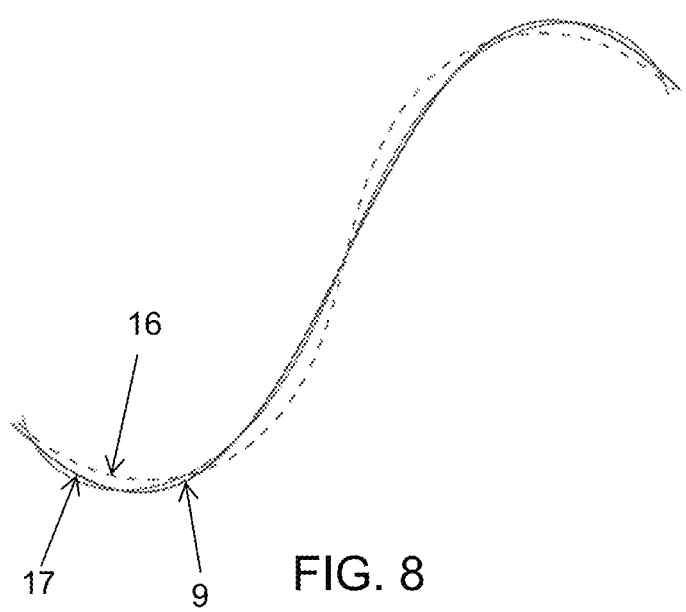
FIG. 8 shows an original representation of a planar curve, an initial elastic curve, and a further optimized elastic curve.

The fact that not only the distance between the two end effectors may be regulated, but also the orientation of the end effectors, enables possibilities to create elastic curves having relatively complex shapes. The elastic curves may have two inflection points. As an example, if one of the end effectors is directed slightly upwards and the other end effector is directed slightly downwards, the elastic curve represented by a cutting blade may be S-shaped, as shown in FIG. 8. The orientation of the end effectors may correspond to the tangents of the elastic curves at the endpoints.

The endpoints of the elastic curves, i.e. the point of attachments to the end effectors, may be chosen such that only a part of the cutting element cuts in the block. This means that in one embodiment only a part of the elastic curve actively represents the planar curve inside the block.

In one embodiment of the method, a change in distance between the two end effectors is calculated, the change in distance representing a difference between two sequential data sets of placement. When controlling the end effectors, the robotic system calculate a set of data for each calculated elastic curve. The set of data comprises information about the relative distance between the end effectors. Preferably the data sets also take into account how the elastic curves are organized in relation to each other, including for example the order of the elastic curves of a collection and their positions in relation to each other. Similarly, information of the rotation of the elastic curves in relation to each other may be included in the data sets. In one embodiment, a rotational change of at least one of the end effectors is calculated, the rotational change representing a difference between two sequential data sets of direction. A rotational change of each of the two end effectors may furthermore be calculated for configuring the flexible cutting element to a shape corresponding to the calculated elastic curve.

Segmentation of Surface into Planar Curves

As stated, the original surface, which may represent a mold, is divided into a number of segments represented by planar curves on the surface. An illustrative simple example is shown in FIG. 4a. In FIG. 4a an original surface 7 is divided into a number of segments represented by a number of curves 9. The collection of curves 9 can be considered to represent the surface.

Each planar curve on the surface may represent at least a part of a contour of a cross-section of the surface. The step of dividing the surface into a number of segments may comprise the step of sweeping the surface and collecting the planar curves corresponding to the contours of cross-sections of the surface. The cross-sections of such sweeping are not necessarily oriented in the same direction—the sweeping may change direction according to the shape of the object or surface. In one embodiment, if the surface to be swept has an elongated shape, the surface is swept in a substantially longitudinal direction of the elongated shape.

Elastic Curves and Approximation

Preferably, for each planar curve, at least one elastic curve representing the planar curve is calculated. An Euler elastica or elastic curve is the solution to the variational problem of minimizing the bending energy among curves of a given length with fixed endpoints and with the tangents prescribed at the endpoints.

In one embodiment an initial approximation or an initial guess of an elastic curve corresponding is made. In the choice of an initial elastic curve the method may be based on the the fact that the curvature function for an arc-length parameterized elastica is affine in a certain direction. The geometry of the curve is analyzed in order to find control parameters for an elastic curve. The initial approximation can then be taken as input for optimization to compute a good approximating elastic curve for a given curve. The step of calculating at least one elastic curve representing the planar curve may therefore be seen as comprising the step of minimizing the distance between the elastic curve and the planar curve of the original surface. The optimization may be done with or without fixed endpoints of the elastic curve.

The planar curve may be parametrized into a number of parameters describing the elastic curve based on characteristics of the planar curve, and, in a second step, the parameters are iteratively optimized to minimize the distance between the elastic curve and the planar curve. For example, a number of control parameters, such as four parameters, may determine the length and shape of the curve. A number of additional parameters, such as three parameters, may determine the position and rotation of the curve in the plane. The set of data corresponding to data corresponding to placement and direction of the two end effectors may be derived from the parameters.

For particularly complex shapes of a planar curve, a planar curve may be segmented into a plurality of planar curve segments, wherein one elastic curve is calculated for each planar curve segment. A following cutting according to the presently disclosed method may then be performed in several steps, wherein each step corresponds to a curve segment. When segmenting the curve, the segments may be chosen such that a plurality of planar curve segments are parametrized such that the shape of the boundary between the curve segments are substantially smooth.

The sequential positioning of the end effectors may be performed for one of the planar curve segments in a first round, and for another of the plurality of planar curve segments in a second round. This process can be repeated for more than two curve segments if necessary. In one embodiment of the presently disclosed method, sequential positioning is therefore iteratively repeated until all planar curve segments have been cut.

The present disclosure further relates to a method for geometrically translating an arbitrary surface, which may be described in a digital format, into a corresponding geometry described by a number of elastic curves. The input surface is segmented into pieces that are chosen to be used for a work object. The segmentation is chosen such that the pieces approximate the input surface as close as possible or approximate the input surface loosely while optimizing for surface curvature continuity between the segment by using a sweeping of continuously elastic curves. For each segment a collection of plane curves is created. Preferably, each curve in the family must be feasible to approximate by an elastic curve. The number of elastic curves may be finite, but sufficient to determine the shape of the surface within predefined tolerances if interpolated. For each curve approximation of the elastic curve is performed within the predefined tolerance. Preferably, the endpoints and end tangents of neighboring each curved should be such that the surface segment is tangent continuous within specified tolerances with the next surface segment.

Inflection Points

In the presently disclosed methods there are several options for reducing the number of inflection points on the surface in order to make the surface more manageable. The planar curves into sub-sections of planar curves, thereby reducing the number of inflection points. The division may be optimized such that a minimum of planar curves are obtained, wherein each planar curve has a maximum of two inflection points.

Alternatively, the original surface may be split into a grid of sub-surfaces, thereby in principle also dividing planar curves of the original surface into sub-sections of planar curves. If the surface is split into a grid of sub-surfaces, this step may be repeated in various ways until the number of inflection points for each surface is two or less. The sizes of the sub-surfaces may also be changed to move the boundaries between the sub-surfaces. Furthermore, if there are inflection points that are located close to each other the curve may be smoothened to ignore the inflection points.

If two given neighboring sub-surfaces have more than two inflection point in at least one of them, one approach is to define two new sub-surfaces and place them so that they overlap each other and the two neighboring blocks.

Cutting Element, Block Element

The cutting element of the presently disclosed method and system may be a wire, a rod, a blade or a strip.

The flexible cutting element may be heatable and configured for cutting the mold from the block thermally by melting the shape corresponding to the calculated elastic curve. This is referred to as hotwire cutting. 'Flexible' refers to the cutting element being able to represent at least planar elastic curves controlled by end effectors. The cutting element may also be any kind of sawing element for other types of cutting than thermal cutting of e.g. foam blocks.

Elastic is generally referred to as the ability of a body to resist a distorting influence or stress and to return to its original shape when the stress is removed. Solid objects deform when forces are applied on them. If the material is elastic, the object will return to its initial shape and size when these forces are removed. The cutting element of the presently disclosed method and system may be an elastic cutting element in the sense that it may behave like an elastic curve and it has an inherent energy to return to its original shape The cutting element of the presently disclosed method and system may also be a blade, such as a rectangular flat blade. The blade could be flexible both in the longitudinal direction of the blade and in the cutting direction of the blade. The blade may also be shaped to have a rounded shape in the cutting direction.

In one example, the cutting element used in the process is a thin metal strip made of a nickel-chromium super alloy. The strip is preheated to a temperature of 300-400° C. by means of Joule heating and then it is slowly brought into contact with a block of e.g. expanded polystyrene to produce melting, and subsequently to form or cut the block into a desired shape. At such high operating temperatures, the blade may be bent into a shape having a predefined curvature and at the same time maintain its elastic and flexibility properties. The temperature dependent variations of the blade shape are may be incorporated in the computational algorithm to secure proper shape representation.

Depending mainly on the cutting element, the block from which the surface is cut may be made of different materials. For thermal cutting with a hotwire or hotblade, the block may be made of foam. The foam may be selected from the group of expanded polystyrene, extruded polystyrene, polymethacrylimide low density rigid foam, expanded polypropylene foam, or polyethylene foam.

System

The present disclosure further relates to a robotic system for manufacturing a mold for creation of complex objects, or, more generally, for creation of complex surfaces from a block, the system comprising:

at least two robotic arms, each robotic arm having an end effector;

a flexible cutting element attached to and extending between the two end effectors; and computing means configured to control the end effectors and execute the calculations according to the presently disclosed method.

The system may be configured to perform any of the steps of the presently disclosed method for manufacturing a mold for creation of complex objects.

The system comprises at least two robotic arms, each robotic arm having an end effector. It is also possible that the two end effectors are not moved but only rotated and that a third arm instead moves the block to be cut. The general calculations are not different but the datasets have to take into account that a third arm moves the block. This may be seen as a special type of conveyor belt.

In a specific application of the presently closed method and system, the method is used for manufacturing of three-dimensional concrete objects, in particular large objects for elements of buildings, such as curved walls of building.

The present disclosure further relates to a non-transitive, computer-readable storage device for storing instructions that, when executed by a processor:

divides a representation of a surface into a number of segments represented by planar curves on the surface;

for each planar curve, calculates at least one elastic curve representing the planar curve;

for each calculated elastic curve, calculates a set of data corresponding to placement and direction of two end effectors of a robotic system for configuring a flexible cutting element extending between the end effectors to a shape corresponding to the calculated elastic curve;

calculates sequential positions of the end effectors according to each set of data representing a movement of the flexible cutting element corresponding to the surface.

This method may also be carried out by presently disclosed robotic system. The calculations of the presently disclosed method may be performed by any processing means using. The computer program instructions may be stored on any media.

DETAILED DESCRIPTION OF THE DRAWINGS

The invention will in the following be described in greater detail with reference to the accompanying drawings. The drawings are exemplary and are intended to illustrate some of the features of the presently disclosed method and system for manufacturing a mold for creation of complex objects, and are not to be construed as limiting to the presently disclosed invention.

FIGS. 1a-c show an embodiment of the system having two robots with arms (2) and end effectors (1) holding a cutting wire (3) in different positions. In FIG. 1a the wire (3) is substantially straight. In FIGS. 1b and 1c the end effectors (1) are configured such that the wire (3) represents an elastic curve.

FIG. 2 shows a further embodiment of the presently disclosed system for manufacturing a mold for creation of complex objects. In this system the block (4) from which the mold is to be cut is held by a third robot (5).

FIGS. 3a-b show examples of elastic-swept surfaces (7) comprising planar curves (9).

FIGS. 4a-c show the process of creating a surface from a representation of an original surface (7), which may have a digital representation. FIG. 4a shows an original input surface (7), which is divided into a number of segments represented by planar curves (9) on the surface. In FIG. 4b the elastic curves (10) (divided into curve segments). The elastic curves (10) are typically not exactly on the original surface (7) but optimized to be as close as possible. The surface (8) of FIG. 4c represents a rationalised surface swept by the calculated elastic curves.

FIGS. 4a-c show a method for handling the number of inflection points. FIG. 5a shows an original input surface (7). In FIG. 5b there are a number of planar curves, which are divided into planar curves (12) having six or more inflection points (13) and planar curves (11) having less than six inflection points (13). FIG. 5c shows a specific planar curve being divided into sub-sections to reduce the number of inflection points (13) for a sub-section.

FIGS. 6a-d show how the surface may change when the surface is optimized with regard to inflection points. In this specific case some of the curves intersect each other, which means that the surface will be cut multiple times. This situation may be changed by surface segmentation (sub-surfaces).

Figure 7A:
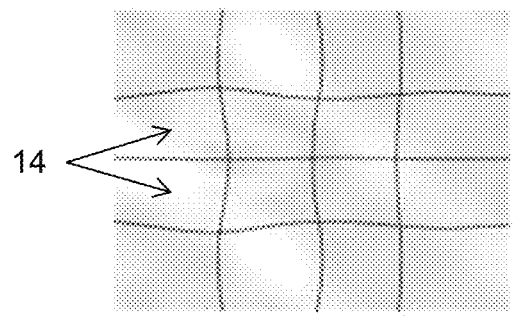
FIGS. 7a-d show examples of segmenting a surface into a grid of sub-surfaces.
Figure 7C:
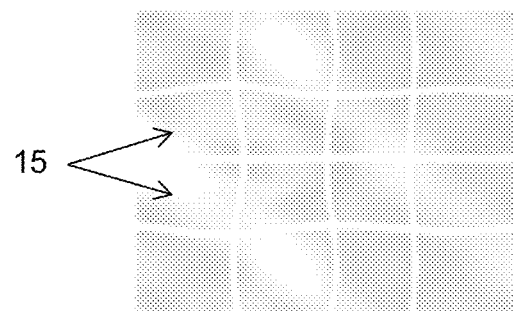
Figure 7B:
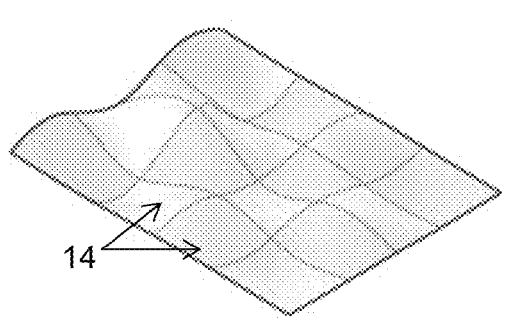
Figure 7D:
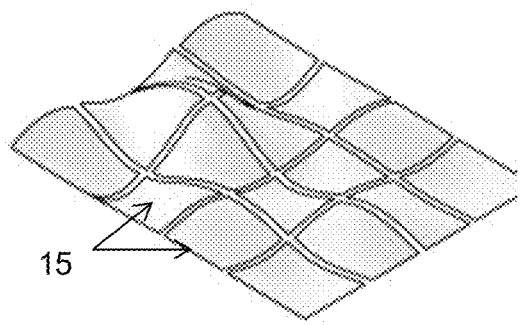

FIGS. 7a-d show examples of segmenting a surface into a grid of sub-surfaces (14, 15). In FIG. 7d the sub-surfaces (15) are the surfaces of parts of a mold. The parts may be put together to form a complete mold.

FIG. 8 shows an example original representation of an S-shaped planar curve (9). An initial approximation (16) of an elastic curve is numerically optimized to the elastic curve (17).

FIGS. 9a-d show how a surface being cut from a block (4) can be used as a mold (17). FIG. 9a shows a representation of a surface in a block (4), the surface divided into sub-surfaces (14). FIG. 9b shows the sub-surfaces (14) cut into sub-blocks (16). FIG. 9c shows the sub-blocks (16) put together to form a complete mold (17).

FIG. 10 shows an example of an object created by the presently disclosed method and system.

FURTHER DETAILS OF THE INVENTION

1. A method for manufacturing a mold for creation of complex objects, such as concrete objects, by controlling and moving two end effectors of a robotic system, the two end effectors having a flexible cutting element attached to and extending between the two end effectors, the method comprising the steps of:
    defining at least one surface representing the inner surface of the mold;
    dividing the surface into a number of segments represented by planar curves on the surface;
    for each planar curve, calculating at least one elastic curve representing the planar curve;
    for each calculated elastic curve, calculating a set of data corresponding to placement and direction of the two end effectors for configuring the flexible cutting element to a shape corresponding to the calculated elastic curve;
    sequentially positioning the end effectors according to each set of data, the flexible cutting element thereby cutting the mold from a block.
2. The method according to any of the preceding items, wherein a change in distance between the two end effectors is calculated, the change in distance representing a difference between two sequential data sets of placement.
3. The method according to any of the preceding items, wherein a rotational change of at least one of the end effectors is calculated, the rotational change representing a difference between two sequential data sets of direction.
4. The method according to any of the preceding items, wherein a rotational change of each of the two end effectors is calculated for configuring the flexible cutting element to a shape corresponding to the calculated elastic curve.
5. The method according to any of the preceding items, wherein the surface representing the inner surface of the mold is a double-curved surface.
6. The method according to any of the preceding items, wherein flexible cutting element is heatable and configured for cutting the mold from the block thermally by melting the shape corresponding to the calculated elastic curve.
7. The method according to any of the preceding items, wherein each planar curve on the surface represents at least a part of a contour of a cross-section of the surface.
8. The method according to item 7, wherein the step of dividing the surface into a number of segments comprises the step of sweeping the surface and collecting the planar curves corresponding to the contours of cross-sections of the surface.
9. The method according to item 8, wherein the surface has an elongated shape and the surface is swept in a substantially longitudinal direction of the elongated shape.
10. The method according to any of the preceding items, wherein the step of calculating at least one elastic curve representing the planar curve comprises the step of minimizing the distance between the elastic curve and the planar curve.
11. The method according to any of the preceding items, wherein the planar curve is segmented into a plurality of planar curve segments, and wherein one elastic curve is calculated for each planar curve segment.
12. The method according to items 10-11, wherein, in a first step of the minimizing the distance between the elastic curve and the planar curve, the planar curve is parametrized into a number of parameters describing the elastic curve based on characteristics of the planar curve, and, in a second step, the parameters are iteratively optimized to minimize the distance between the elastic curve and the planar curve.
13. The method according to any of items 11-12, wherein plurality of planar curve segments are parametrized such that the shape of the boundary between the curve segments are substantially smooth.
14. The method according to any of items 12-13, wherein the set of data corresponding to positioning are derived from the parameters.
15. The method according to any of items 11-14, wherein the sequential positioning the end effectors are performed for one of the plurality of planar curve segments in a first round, and for another of the plurality of planar curve segments in a second round.
16. The method according to item 15, further comprising the step of iteratively repeating the sequential positioning of the end effectors until all planar curve segments have been cut.
17. The method according to any of the preceding items, further comprising the step of dividing the planar curves into sub-sections of planar curves, thereby reducing the number of inflection points.
18. The method according to any of the preceding items, further comprising the step of segmenting the surface into a grid of sub-surfaces, thereby dividing the planar curves into sub-sections of planar curves.
19. The method according to item 18, further comprising the step of repeating the segmentation of the surfaces until the number of inflection points for each surface is two or less.
20. The method according to any of items 18-19, further comprising the step of reorganizing the sub-surfaces to reduce the number of inflection points for each surface.

21. The method according to any of the preceding items, using a wire, a rod, a blade or a strip as cutting element.

22. The method according to any of the preceding items, using a mechanical cutting element.

23. The method according to any of the preceding items, using a sawing element as a cutting element.

24. The method according to any of the preceding items, using an elastic cutting element.

25. The method according to any of the preceding items, further comprising the step of forming the blade into a defined shape, such as a rounded shape.

26. The method according to any of the preceding items, further comprising the step of heating the cutting element before thermally cutting the mold.

27. The method according to any of the preceding items, wherein the block is made of foam.

28. The method according to item 27, wherein the foam is selected from the group of expanded polystyrene, extruded polystyrene, polymethacrylimide low density rigid foam, expanded polypropylene foam, or polyethylene foam.

29. The method according to any of the preceding items, wherein the complex objects are concrete objects.

30. The method according to any of the preceding items, wherein the complex objects are three-dimensional objects.

31. A robotic system for manufacturing a mold for creation of complex objects, the system comprising:
    at least two robotic arms, each robotic arm having an end effector;
    a flexible cutting element attached to and extending between the two end effectors; and
    computing means configured to control the end effectors and execute the calculations according to the method of any of items 1-30.

32. A mold for creation of a concrete object provided by means of the method of any of items 1-30.

33. A non-transitive, computer-readable storage device for storing instructions that, when executed by a processor:
    divides a representation of a surface into a number of segments represented by planar curves on the surface;
    for each planar curve, calculates at least one elastic curve representing the planar curve;
    for each calculated elastic curve, calculates a set of data corresponding to placement and direction of two end effectors of a robotic system for configuring a flexible cutting element extending between the end effectors to a shape corresponding to the calculated elastic curve;
    calculates sequential positions of the end effectors according to each set of data representing a movement of the flexible cutting element corresponding to the surface.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for manufacturing a mold for creation of complex objects by controlling and moving two end effectors of a robotic system, the two end effectors having a flexible cutting element attached to and extending between the two end effectors, the method comprising the steps of:
    defining at least one surface representing the inner surface of the mold;
    dividing the surface into a number of segments represented by planar curves on the surface;
    calculating, for each planar curve, at least one elastic curve representing the planar curve, wherein the planar curve is segmented into a plurality of planar curve segments, and wherein one elastic curve is calculated for each planar curve segment;
    calculating, for each calculated elastic curve, a set of data corresponding to placement and direction of the two end effectors for configuring the flexible cutting element to a shape corresponding to the calculated elastic curve; and
    sequentially positioning the end effectors according to each set of data, the flexible cutting element thereby cutting the mold from a block.

2. The method according to claim 1, wherein a change in distance between the two end effectors is calculated, the change in distance representing a difference between two sequential data sets of placement.

3. The method according to claim 1, wherein a rotational change of at least one of the end effectors is calculated, the rotational change representing a difference between two sequential data sets of direction.

4. The method according to claim 1, wherein a rotational change of each of the two end effectors is calculated for configuring the flexible cutting element to a shape corresponding to the calculated elastic curve.

5. The method according to claim 1, wherein the surface representing the inner surface of the mold is a double-curved surface.

6. The method according to claim 1, wherein the step of calculating at least one elastic curve representing the planar curve comprises the step of minimizing the distance between the elastic curve and the planar curve.

7. The method according to claim 6, wherein, in a first step of the minimizing the distance between the elastic curve and the planar curve, the planar curve is parametrized into a number of parameters describing the elastic curve based on characteristics of the planar curve, and, in a second step, the parameters are iteratively optimized to minimize the distance between the elastic curve and the planar curve.

8. A method for manufacturing a mold for creation of complex objects by controlling and moving two end effectors of a robotic system, the two end effectors having a flexible cutting element attached to and extending between the two end effectors, the method comprising the steps of:
    defining at least one surface representing the inner surface of the mold;
    dividing the surface into a number of segments represented by planar curves on the surface;
    calculating, for each planar curve at least one elastic curve representing the planar curve;
    segmenting the surface into a grid of sub-surfaces, thereby dividing the planar curves into sub-sections of planar curves;
    calculating, for each calculated elastic curve, a set of data corresponding to placement and direction of the two end effectors for configuring the flexible cutting element to a shape corresponding to the calculated elastic curve; and
    sequentially positioning the end effectors according to each set of data, the flexible cutting element thereby cutting the mold from a block.

9. The method according to claim 1, using a wire, a rod, a blade or a strip as cutting element.

10. The method according to claim 1, using an elastic cutting element.

11. A robotic system for manufacturing a mold for creation of complex objects, the system comprising:

at least two robotic arms, each robotic arm having an end effector;
a flexible cutting element attached to and extending between the two end effectors; and
a non-transitory computer-readable storage device for storing instructions that, when executed by a processor:
control the end effectors; and
execute the calculations comprising:
dividing at least one surface representing the inner surface of the mold;
dividing the surface into a number of segments represented by planar curves on the surface;
calculating, for each planar curve, at least one elastic curve representing the planar curve, wherein the planar curve is segmented into a plurality of planar curve segments, and wherein one elastic curve is calculated for each planar curve segment;
calculating, for each calculated elastic curve, a set of data corresponding to placement and direction of the two end effectors for configuring the flexible cutting element to a shape corresponding to the calculated elastic curve; and
sequentially positioning the end effectors according to each set of data, the flexible cutting element thereby cutting the mold from a block.

12. A non-transitory, computer-readable storage device for storing instructions that, when executed by a processor:
divides a representation of a surface into a number of segments represented by planar curves on the surface;
for each planar curve, calculates at least one elastic curve representing the planar curve, segments the planar curve into a plurality of planar curve segments, and for each planar curve segment, calculates at least one elastic curve;
for each calculated elastic curve, calculates a set of data corresponding to placement and direction of two end effectors of a robotic system for configuring a flexible cutting element extending between the end effectors to a shape corresponding to the calculated elastic curve; and calculates sequential positions of the end effectors according to each set of data representing a movement of the flexible cutting element corresponding to the surface.

13. The method according to claim 1, wherein the complex objects are concrete objects.

14. The method according to claim 8, further comprising the step of repeating the segmenting step until the number of inflection points for each surface is two or less, and reorganizing the sub-surfaces to reduce the number of inflection points for each surface.

15. The method according to claim 8, wherein the complex objects are concrete objects.

16. A robotic system for manufacturing a mold for creation of complex objects, the system comprising:
at least two robotic arms, each robotic arm having an end effector;
a flexible cutting element attached to and extending between the two end effectors; and
a non-transitory computer-readable storage device for storing instructions that, when executed by a processor:
control the end effectors; and
execute the calculations comprising:
defining at least one surface representing the inner surface of the mold;
dividing the surface into a number of segments represented by planar curves on the surface;
calculating, for each planar curve, at least one elastic curve representing the planar curve;
segmenting the surface into a grid of sub-surfaces, thereby dividing the planar curves into sub-sections of planar curves;
calculating, for each calculated elastic curve, a set of data corresponding to placement and direction of the two end effectors for configuring the flexible cutting element to a shape corresponding to the calculated elastic curve; and
sequentially positioning the end effectors according to each set of data, the flexible cutting element thereby cutting the mold from a block.

* * * * *